Jan. 8, 1929.　　　　　　　　　　　　　　　　1,698,666
J. M. ALMEDIA
DIRECTIONAL SIGNAL FOR VEHICLES
Filed Feb. 8, 1927　　　2 Sheets-Sheet 1
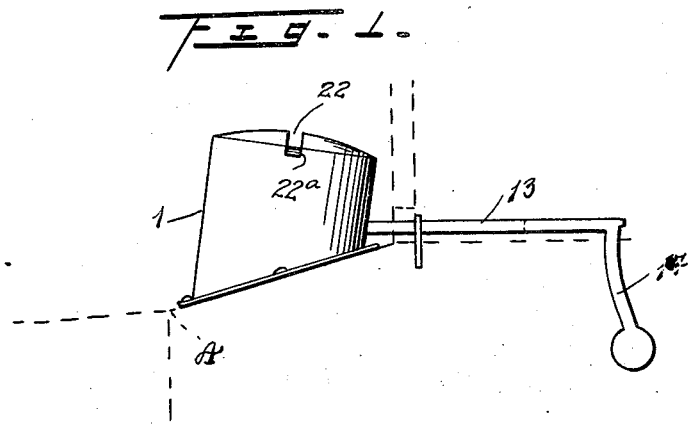
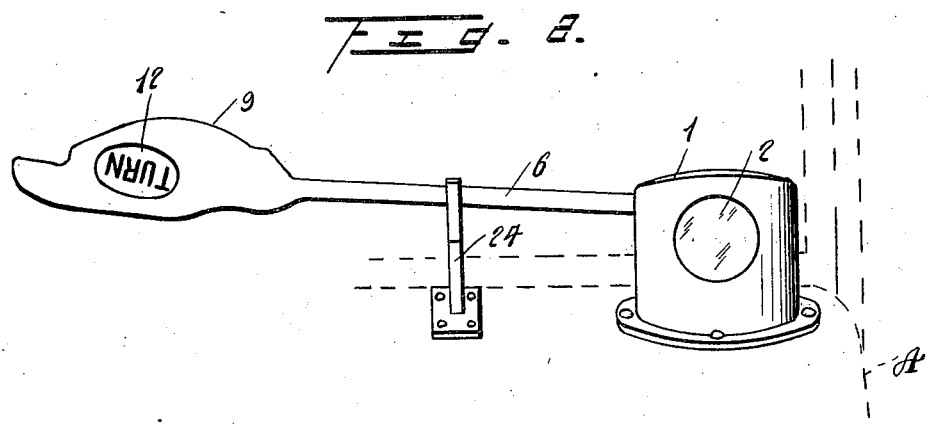
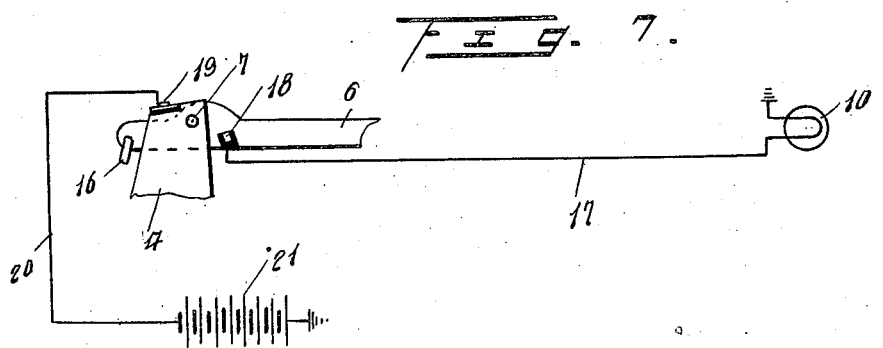
Inventor
J. M. Almedia.
By
Attorney

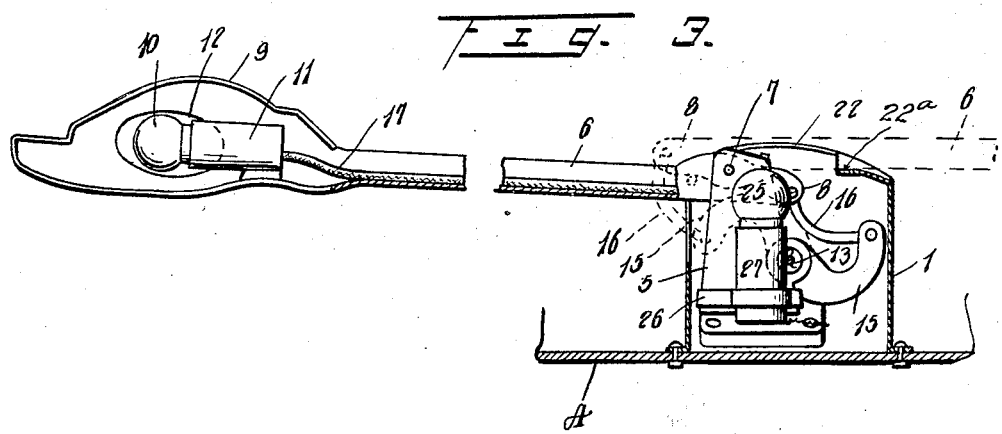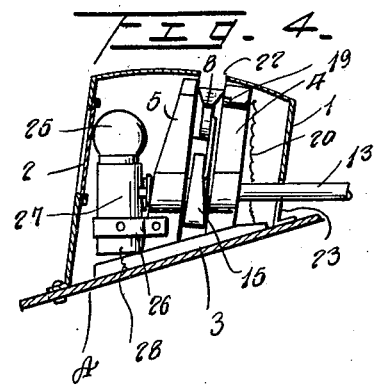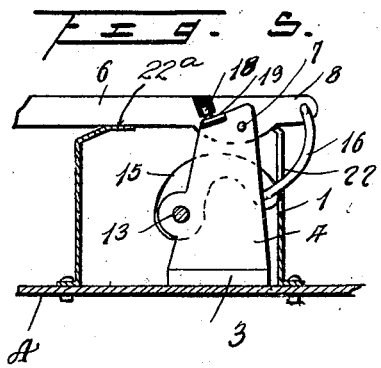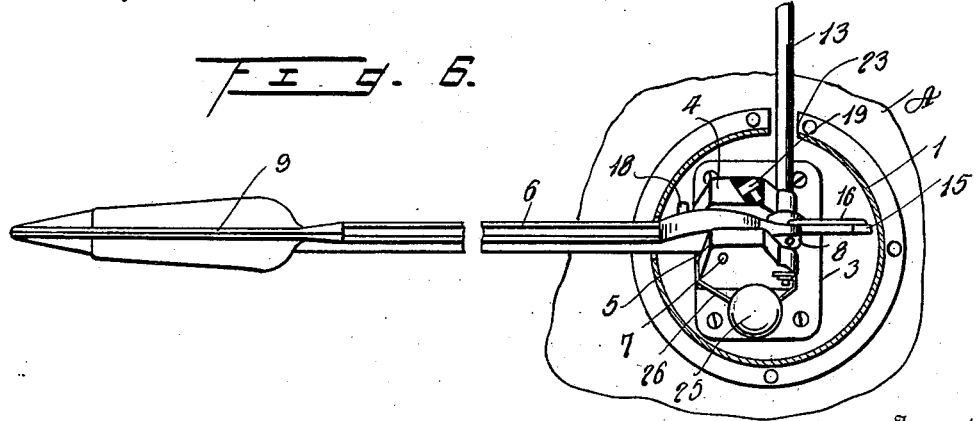

Patented Jan. 8, 1929.

1,698,666

UNITED STATES PATENT OFFICE.

JOSE M. ALMEDIA, OF LOS ANGELES, CALIFORNIA.

DIRECTIONAL SIGNAL FOR VEHICLES.

Application filed February 8, 1927. Serial No. 166,732.

The invention relates to direction signals for automobiles and other road vehicles and has for its object the provision of a signal of the type stated that is mounted in the side lamp casing in use on automobiles and operable from the driver's seat by means of a shaft extending into the body of the vehicle, the signal including an arm pivotally mounted and connected for operation with the operating shaft, said arm carrying a signal head that is illuminated by an electric lamp having one of its terminals grounded on the metal of the signal head arm and connected to the metal of the vehicle to one terminal of the battery, and having the other terminal of the lamp connected with the contact member carried by the arm and engaging a contact member in circuit with the other terminal of the battery to close the circuit to the lamp to ignite it when the arm is in signaling position, the circuit being broken when the arm is moved to a non-signaling position.

The invention will be described in detail hereinafter and will be found illustrated in the accompanying drawings, in which Figure 1 is a side view of a motor vehicle, shown fragmentarily, in broken lines, with the directional signal applied thereto, Figure 2 is a front view of the part shown in Figure 1, Figure 3 is a view similar to Figure 2, showing parts of the device in section, the signal arm being shown in full lines in a non-signaling position, and in dotted lines in a signaling position, Figure 4 is a side view of the device showing the casing in section, Figure 5 is a rear view with the casing in section, Figure 6 is a view in perspective of the signaling device, the casing being in section, and Figure 7 is a diagrammatic view of the electric circuit for igniting the lamp in the signal head.

In the drawings similar reference characters will be used to designate corresponding parts throughout the several views.

The operating mechanism of the directional signal is contained within the casing 1, secured to the cowl of an automobile designated generally at A, said casing 1 being utilized also as a side light for the vehicle, 2 indicating a lens for the light.

Secured within the casing 1 is a base plate 3 having spaced standards 4 and 5 rising therefrom between which is pivotally mounted a signal arm 6 by means of a pivot 7, and having a rearward extension 8, and a signal head 9, said signal head 9 being preferably made of two parts capable of separation for the replacement of an electric lamp 10 mounted in socket 11 of any approved type, that is grounded on the metal of one of the head members 9, 12 indicating a light diffusing panel mounted in each side of the head 9, and may have the directional word "Turn" displayed thereon. The head 9 may be of any desired shape other than that shown in the drawings, such, for instance, as a hand with the index finger pointing, or other contour, this not being a part of the invention. A shaft 13 is journaled in the standards 4 and 5, and extended into the body of the vehicle as suggested in Figure 1 provided with an actuating arm 14 operable by the operator of the vehicle. 15 indicates a crank arm secured to shaft 13 and is preferably, as indicated in the drawings, of an arcuate type, and is connected at its free end to the rearward extension 8 by means of a link 16. It will be understood that by turning the shaft 13, the arm 6 may be moved from the position shown in full lines in Figure 3 to the dotted line position as shown in the same figure, a movement of the shaft 13 in a reverse direction returning the arm to its original position.

As heretofore indicated, the type of lamp 10 and socket 11 that is used for illuminating the signal head 9 with the single contact type, the socket 11 being grounded to connect one terminal of the lamp filament with the source of energy. 17 designates an insulated wire connected with the single contact in the socket 11, and in circuit with the contact member 18 carried by the arm 6, and insulated therefrom, said contact 18 being adapted to engage contact member 19 on supporting member 4 that is in circuit with the other terminal of the source of energy. In Figure 7 is shown a diagram of the circuit for the lamp 10 including the wire 17, the contact member 18, contact member 19, and a wire 20 connecting contact member 19 with one of the terminals of battery 21, the battery 21, and the lamp 10 being shown grounded to complete the circuit to the lamp. From this construction and arrangement, it will be apparent that the lamp 10 will be lighted when the arm 6 is in signaling position, as shown in Figure 5, the contact members 18 and 19 then being in engagement, and when the arm is moved into non-signaling position the lamp will be extinguished by breaking the contact between the members 18 and 19.

The casing 1 is provided in its top and inner sides with a slot 22 to receive the signal arm 16 and the operating mechanism therefor including the rearward extension 8, the crank arm 15 and link 16, and a slot 23 for the reception of the shaft 13. The casing 1 is provided immediately below the outer end of the slot 22 with an inwardly directed shoulder 22ᵃ upon which the signal arm 6 rests when in signaling position.

24 is a rest for the arm 6 when in non-signaling position.

25 designates a lamp for the side lamp of the automobile heretofore referred to that is also of the single contact type and grounded through strap 26 holding the socket 27 onto the support 5, 28 designating a wire connected with the single contact in the socket 27.

What is claimed is:—

1. A directional signal for vehicles, comprising a standard, a signal arm pivoted adjacent one of its ends to the standard so as to be capable of swinging substantially one hundred and eighty degrees, a shaft arranged at right angles to the signal arm and journaled in the standard below and to one side of the pivot of the signal arm, a crank arm secured to the shaft, a link connected to the crank arm and to said end of the signal arm, and a handle secured to the shaft.

2. A directional signal for vehicles, comprising a standard, so as to be capable of swinging substantially one hundred and eighty degrees, a signal arm pivoted adjacent one of its ends to the standard, a shaft arranged at right angles to the signal arm and journaled in the standard below and to one side of the pivot of the signal arm, an arcuate crank arm secured to the shaft, an arcuate link connected to the crank arm and to said end of the signal arm, and a handle secured to the shaft.

3. A directional signal for vehicles, comprising a casing provided in its top and inner sides with a slot, an inwardly directed shoulder carried by the casing immediately below the outer end of the slot, a standard within the casing, a signal arm pivoted at one end to the standard capable of swinging substantially one hundred and eighty degrees, and extending through the slot and adapted to rest on the shoulder when in signaling position, and means for operating the signal arm.

In testimony whereof I affix my signature.

JOSE M. ALMEDIA.